(No Model.)
H. J. LAWRENCE.
WHEEL FOR VEHICLES.
No. 379,315. Patented Mar. 13, 1888.
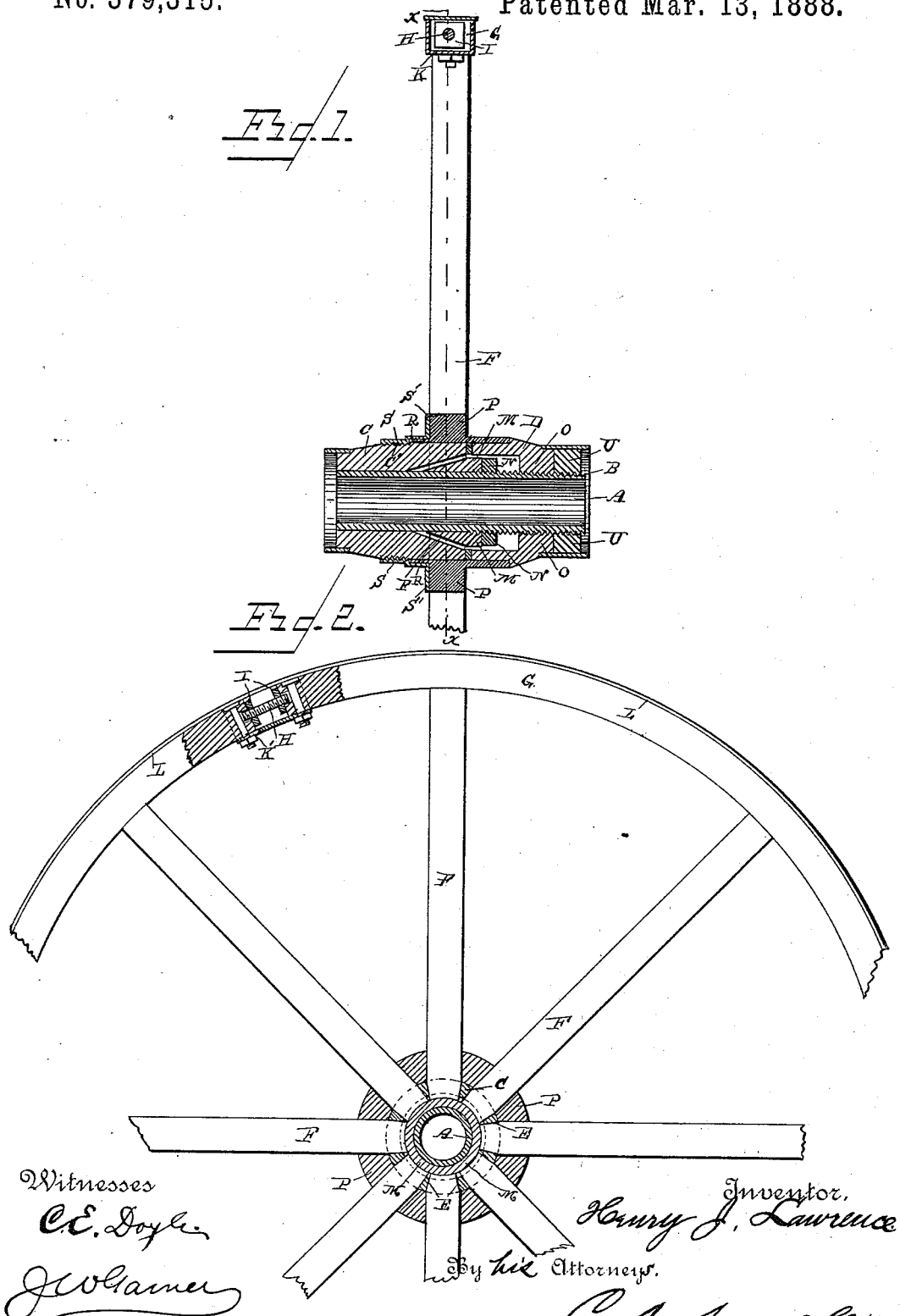
Witnesses
C. E. Doyle
J. W. Garner
Inventor,
Henry J. Lawrence
By his Attorneys,
C. A. Snowden

UNITED STATES PATENT OFFICE.

HENRY JONATHAN LAWRENCE, OF VALPARAISO, INDIANA.

WHEEL FOR VEHICLES.

SPECIFICATION forming part of Letters Patent No. 379,315, dated March 13, 1888.

Application filed October 13, 1886. Renewed December 16, 1887. Serial No. 258,084. (No model.)

*To all whom it may concern:*

Be it known that I, HENRY JONATHAN LAWRENCE, a citizen of the United States, residing at Valparaiso, in the county of Porter and State of Indiana, have invented a new and useful Improvement in Wheels for Vehicles, of which the following is a specification.

My invention relates to an improvement in wheels for vehicles; and it consists in the peculiar construction and combination of devices, that will be more fully set forth hereinafter, and particularly pointed out in the claim.

The object of my invention is to provide a vehicle-wheel with means whereby a spoke may be readily replaced by a new one when it becomes broken, and whereby the spokes may be expanded radially against the felly in order to tighten the tire thereon, and these objects I attain by the construction hereinafter described, and illustrated in the accompanying drawings, in which—

Figure 1 is a vertical sectional view taken longitudinally through the hub. Fig. 2 is a sectional view taken transversely through the hub on the line $x$ $x$ of Fig. 1.

A represents a sleeve or box of the wheel, which is provided at one end with screw-threads B, that extend nearly to the center of the sleeve. The hub is made of two sections, C and D, the section C being the rear section and the section D being the front section, the said sections of the hub being separable. The box or sleeve is secured to the section C in any suitable manner, and the said section is provided near its front edge with a series of radial openings, E, in which the inner ends of the spokes F are inserted. The said radial openings extend entirely through the hub, so that the inner ends of the spokes rest against the sleeve or box A, and the said inner ends of the spokes are beveled or inclined, as shown.

G represents the felly, which is attached to the outer ends of the spokes in the usual manner, and the meeting ends of the said felly are connected together by means of a temper-screw, H, the ends of which are inserted in openings that are made in the ends of the felly, and the said screw is provided with adjusting-nuts I, which bear against the meeting ends of the felly, so that the latter may be contracted or expanded. The temper-screw and the adjusting-nuts are covered by a box, K, which is made of a single piece of sheet metal bent so as to enable it to embrace the sides of the felly, and the said box is rigidly secured to one section of the felly by a bolt or screw, and is provided at its opposite end with an elongated slot, K', through which extends a screw that secures it to the other member of the felly-joint.

From the foregoing it will be seen that as the felly is contracted or expanded the screw which connects one end or member thereof will work back and forth in the longitudinal slot in the box K.

L represents the tire, which is of the usual construction and is secured on the felly in the ordinary manner.

The section C of the hub is provided with an exterior screw-thread, C'.

M represents an annular collar, which fits on the box or sleeve A and has its sides inclined, as shown, toward one end, the said inclined sides being adapted to bear against the inner inclined ends of the spokes. This annular collar forms a spreading-cone, which is adapted to be forced inwardly against the inner ends of the spokes, so as to expand the latter radially against the felly, and thus tighten the tire thereon.

N represents a nut which is adapted to be screwed upon the sleeve A and bears against the outer end of the spreading-cone, so as to force the latter against the inner end of the hub.

The rear side of the section D of the hub is made hollow, so that it may pass over the nut N and the spreading-cone M, and thereby a shoulder, O, is formed near the front end of the section D. From the inner end of the said section projects an annular flange, P, in which are made a series of radial openings adapted to receive the spokes, and from the spaces intermediate between the said openings project rearwardly-extending tongues R, which bear upon the section C of the hub in rear of the inner ends of the spokes.

S represents an annular collar which is interiorly screw-threaded and is adapted to fit on the thread C' of the section C. The front side of the said collar is flared slightly, so as to enable it to receive the tongues R of the section D, and the front edge of the said collar is also provided with an annular flange, S', which bears against the rear side of the spokes. After the spreading-cone has been secured in position against the inner ends of the spokes by the nut N, the section D of the hub is placed on the outer end of the sleeve A and forced rearwardly thereon, so that the spokes will enter the openings in its flange P and the tongues R will be forced rearwardly beyond the inner sides of the spokes. The collar S is then screwed onto the section C of the hub and is caused to bear against the rear sides of the spokes, and a nut, U, is then screwed onto the threaded end of the sleeve and bears against the outer side of the annular shoulder O of the hub-section D, thus forcing the said hub section rearwardly against the front sides of the spokes, and thereby the latter are firmly clamped in position and are securely fastened to the hub.

When the spokes and the fellies shrink in dry weather, so that the tire becomes loose, the spreading-cone is forced farther inwardly against the inner edge of the spokes, so as to move them radially, and thus expand the felly to tighten the tire. It will also be readily understood that if a spoke becomes broken it may be easily replaced by a new one without employing a skilled mechanic to do the work, thus effecting a great economy in repairs, as spokes may be readily purchased at wheelwright supply-shops.

Having thus described my invention, I claim—

The combination, in a vehicle-wheel, of the hub-section C, having the screw-thread C' on its outer side and provided with radial openings to receive the inner ends of the spokes, the hub-section D, having the annular projecting collar P on its rear side, provided with the openings to receive the spokes, the sleeve attached to the section C and having the outer threaded end, the nut U, adapted to be screwed upon the said sleeve to force the section D rearwardly against the section C, so as to bear against the front sides of the spokes, and the annular collar S, adapted to be screwed onto the hub-section C and provided with the flange to bear against the rear side of the spokes, for the purpose set forth, substantially as described.

In testimony that I claim the foregoing as my own I have hereto affixed my signature in presence of two witnesses.

HENRY JONATHAN LAWRENCE.

Witnesses:
   M. H. EASTWOOD,
   THOMAS PRATT.